(12) United States Patent
Watanabe (10) Patent No.: US 10,619,676 B2
(45) Date of Patent: Apr. 14, 2020

(54) COUPLING AND METHOD FOR FIXING THE SAME

(71) Applicant: FANUC CORPORATION, Yamanashi (JP)

(72) Inventor: Kei Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 55 days.

(21) Appl. No.: 16/165,031

(22) Filed: Oct. 19, 2018

(65) Prior Publication Data

US 2019/0154085 A1 May 23, 2019

(30) Foreign Application Priority Data

Nov. 21, 2017 (JP) ................................. 2017-223640

(51) Int. Cl.
*F16C 1/06* (2006.01)
*F16D 1/06* (2006.01)
*F16D 1/08* (2006.01)

(52) U.S. Cl.
CPC ............ *F16D 1/06* (2013.01); *F16D 1/0847* (2013.01); *F16D 1/0864* (2013.01)

(58) Field of Classification Search
CPC ... F16D 3/387; F16D 3/10; F16D 3/44; F16D 1/0864; F16D 1/116; F16B 2/065; B62D 1/10; B62D 1/185; B62D 1/20
See application file for complete search history.

(56) References Cited

U.S. PATENT DOCUMENTS 4,068,965 A * 1/1978 Lichti ....................... F16D 1/04
 403/313
4,645,368 A * 2/1987 Simpson ................. F16D 1/116
 403/324

(Continued)

FOREIGN PATENT DOCUMENTS

EP 2 551 068 A1 1/2013
JP S54-133260 U 9/1979
(Continued)

OTHER PUBLICATIONS

Japanese Office Action dated Jul. 16, 2019, in connection with corresponding JP Application No. 2017-223640 (8 pgs., including English translation).

(Continued)

*Primary Examiner* — Daniel J Wiley
(74) *Attorney, Agent, or Firm* — Maier & Maier, PLLC (57) ABSTRACT

A coupling including a body member including a fitting hole into which an end of a spline shaft is fitted, and a connecting portion, the shaft including spline grooves linearly extending in an axial direction in a circumferential direction; a positioning mechanism positioning the body member in the circumferential direction with respect to the shaft fitted into the fitting hole; and a fixing portion fixing, to the shaft, the body member being positioned. The positioning mechanism includes a screw hole provided in the body member so as to penetrate from an outer surface of the body member to an inner surface of the fitting hole, a screw member fastened into the screw hole, and a pressing part having a circular cross section, provided in a tip of the screw member, and pressed against the spline groove by fastening of the screw member into the screw hole.

1 Claim, 8 Drawing Sheets

(56) References Cited

U.S. PATENT DOCUMENTS

| | | | | |
|---|---|---|---|---|
| 4,899,611 A * | 2/1990 | Pinna | B62D 1/20 74/492 |
| 5,090,833 A * | 2/1992 | Oertle | B62D 1/20 403/12 |
| 5,253,949 A * | 10/1993 | Oxley | B62D 1/16 403/155 |
| 5,358,350 A * | 10/1994 | Oertle | B62D 1/20 403/12 |
| 5,366,316 A * | 11/1994 | Cymbal | B62D 1/16 403/359.2 |
| 5,403,111 A * | 4/1995 | Wey | F16B 21/16 403/290 |
| 5,580,184 A * | 12/1996 | Riccitelli | F16D 1/0864 280/779 |
| 5,628,578 A * | 5/1997 | McClanahan | B62D 1/16 403/13 |
| 7,179,009 B2 * | 2/2007 | Stimpfl | B62D 1/20 403/53 |
| 7,488,134 B2 * | 2/2009 | Kinme | B62D 1/16 403/12 |
| 7,666,101 B2 * | 2/2010 | Kakimoto | F16D 1/0864 403/236 |
| 8,262,309 B2 * | 9/2012 | Dallara | F16D 3/387 403/233 |
| 9,086,097 B2 * | 7/2015 | Mielke | F16D 1/0864 |
| 9,581,205 B2 * | 2/2017 | Knoth | F16D 1/0864 |
| 2004/0091308 A1 * | 5/2004 | Kinme | F16D 3/387 403/235 |
| 2006/0073902 A1 * | 4/2006 | Sekine | B62D 1/16 464/134 |
| 2014/0178127 A1 * | 6/2014 | Mottier | B62D 1/20 403/373 |
| 2014/0349773 A1 * | 11/2014 | Anders | B62D 1/16 464/182 |
| 2015/0323050 A1 | 11/2015 | Ohno | |

FOREIGN PATENT DOCUMENTS

| | | |
|---|---|---|
| JP | H07-217616 A | 8/1995 |
| JP | 2000-294991 A | 10/2000 |
| JP | 2009-257458 A | 11/2009 |
| JP | 2010-216610 A | 9/2010 |
| JP | 2013-022715 A | 2/2013 |
| JP | 2013-220488 A | 10/2013 |
| JP | 2016-215371 A | 12/2016 |
| WO | 2014/083597 A1 | 6/2014 |

OTHER PUBLICATIONS

Japanese Decision to Grant a Patent dated Oct. 1, 2019, in connection with corresponding JP Application No. 2017-223640 (6 pgs., including English translation).

* cited by examiner

COUPLING AND METHOD FOR FIXING THE SAME

CROSS-REFERENCE TO RELATED APPLICATIONS

This application claims the benefit of Japanese Patent Application No. 2017-223640, the content of which is incorporated herein by reference.

FIELD

The present invention relates to a coupling and a method for fixing the same.

BACKGROUND

Conventionally, a ball spline mechanism is known as a mechanism for causing a shaft disposed in a tip of a horizontal articulated type robot along the vertical direction to rotate around the center of the shaft and linearly move in the vertical direction (for example, refer to Japanese Unexamined Patent Application, Publication No. 2009-257458).

In this Japanese Unexamined Patent Application, Publication No. 2009-257458, a mounting member for mounting a work device such as a robot hand or the like is fixed to a lower end of the shaft.

SUMMARY

An aspect of the present invention provides a coupling including: a body member including a fitting hole into which an end of a spline shaft is fitted, and a connecting portion to which another member is mounted, the spline shaft including a plurality of spline grooves linearly extending in an axial direction at an interval in a circumferential direction; a positioning mechanism that positions the body member in the circumferential direction of the spline shaft with respect to the spline shaft fitted into the fitting hole of the body member; and a fixing portion that fixes, to the spline shaft, the body member in a state of being positioned by the positioning mechanism, wherein the positioning mechanism includes a screw hole provided in the body member so as to penetrate from an outer surface of the body member to an inner surface of the fitting hole along a radial direction, a screw member fastened into the screw hole, and a pressing part having a circular cross section, provided in a tip of the screw member, and pressed against the spline groove by fastening of the screw member into the screw hole.

Another aspect of the present invention provides a method for fixing a coupling including the steps of: fitting an end of a spline shaft including a plurality of spline grooves into a fitting hole of a body member, the plurality of spline grooves linearly extending in an axial direction at an interval in a circumferential direction; pressing a pressing part having a circular cross section, provided in a tip of a screw member, against the spline groove by fastening the screw member into a screw hole provided in the body member so as to penetrate from an outer surface of the body member to an inner surface of the fitting hole along a radial direction, and positioning the body member in the circumferential direction of the spline shaft; and fixing the body member in a state of being positioned to the spline shaft.

DETAILED DESCRIPTION

A coupling 1 according to an embodiment of the present invention will be hereinafter described with reference to the drawings.

Figure 1:
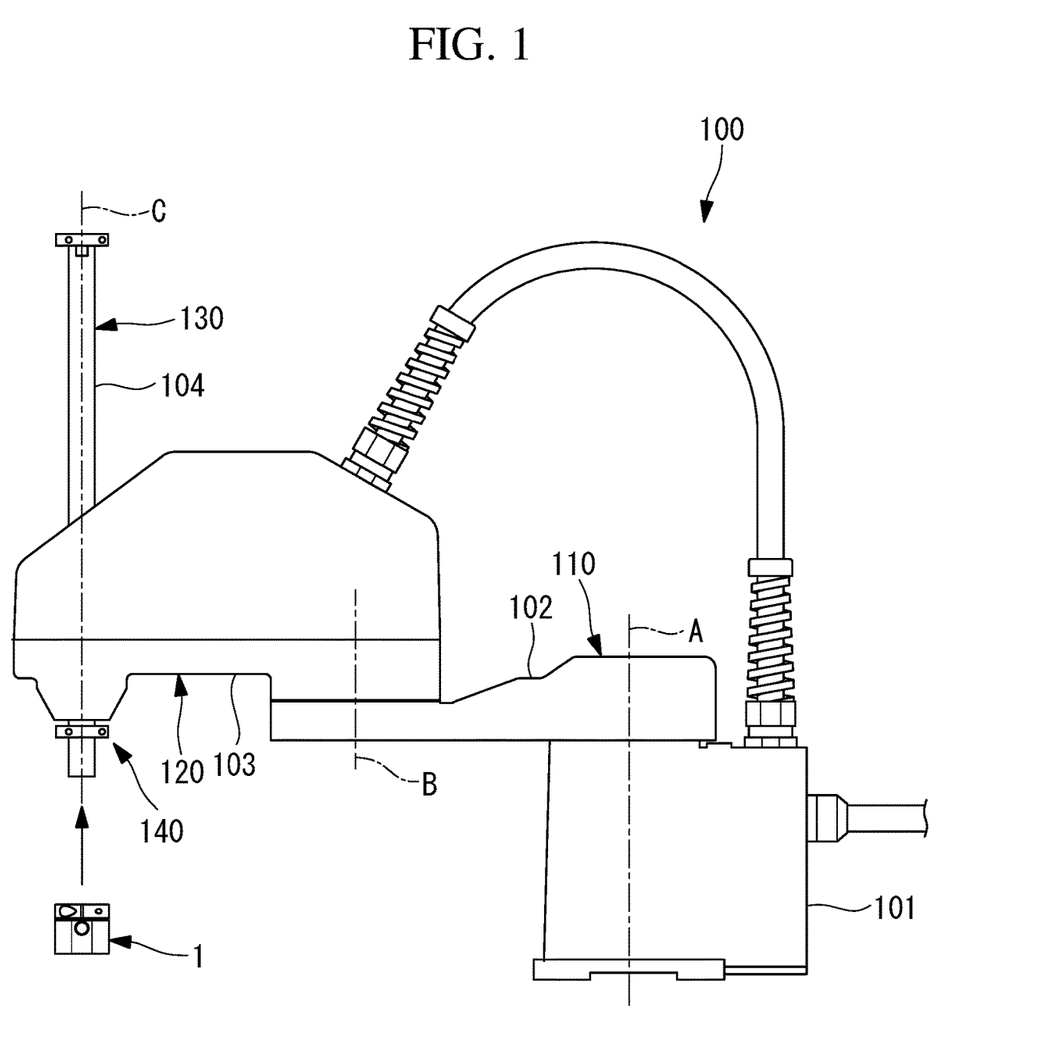
FIG. 1 is a front view illustrating a horizontal articulated type robot that detachably mounts a coupling according to an embodiment of the present invention.
Figure 2:
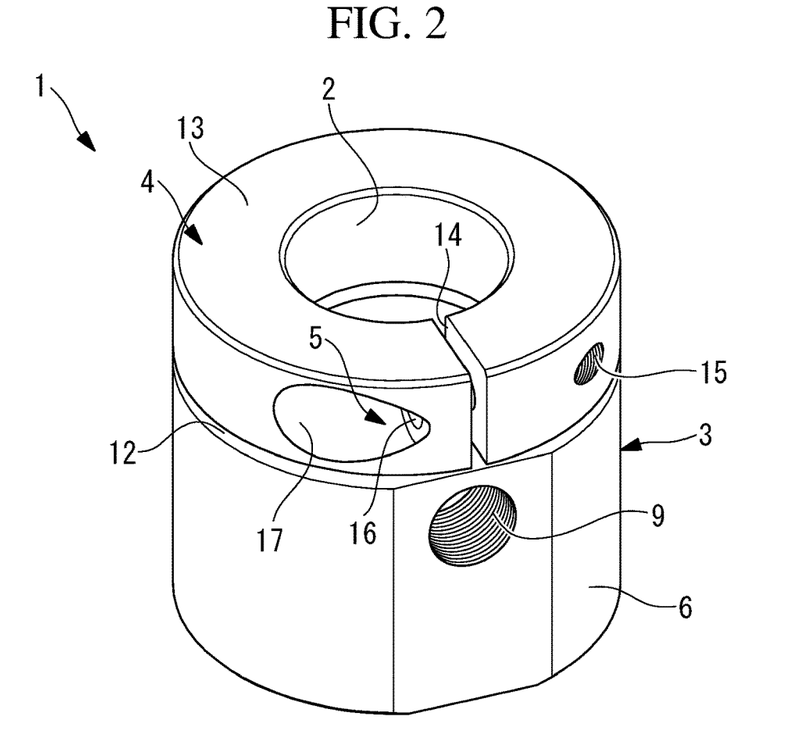
FIG. 2 is a perspective view illustrating the coupling according to the embodiment of the present invention.
Figure 3:
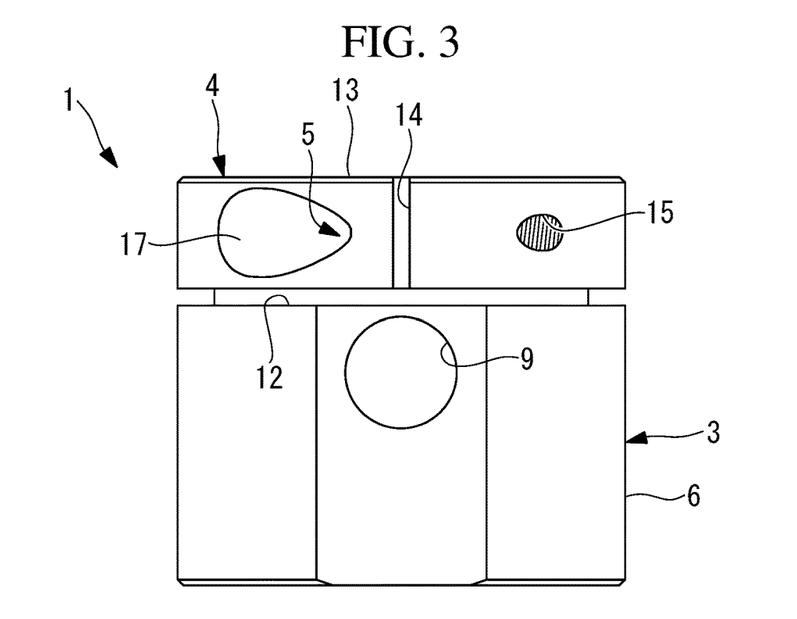
FIG. 3 is a front view of the coupling of FIG. 2.
Figure 4:
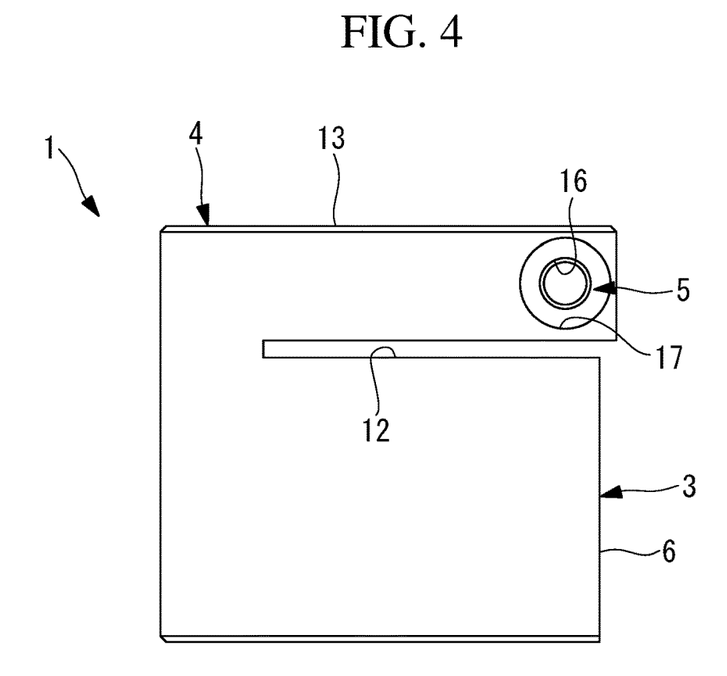
FIG. 4 is a left side view of the coupling of FIG. 2.
Figure 5:
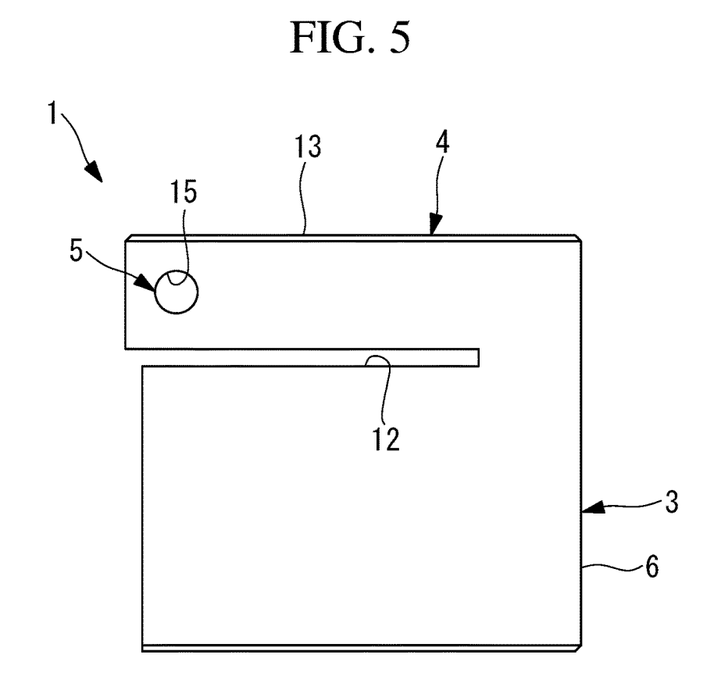
FIG. 5 is a right side view of the coupling of FIG. 2.
Figure 6:
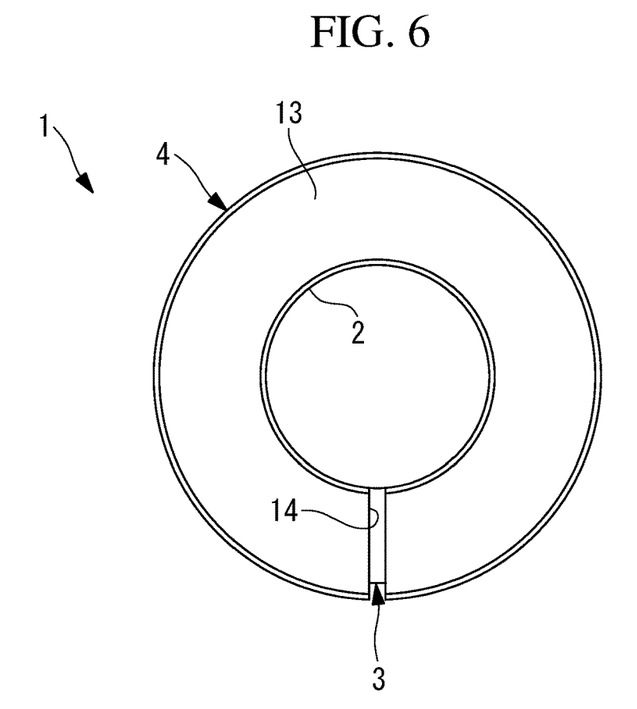
FIG. 6 is a top view of the coupling of FIG. 2.

The coupling 1 according to this embodiment is a member which is used as a mounting member for a tip of a horizontal articulated type robot 100 illustrated in FIG. 1.

As illustrated in FIG. 1, the horizontal articulated type robot 100 includes a first shaft 110, a second shaft 120, a third shaft 130, and a fourth shaft 140. The first shaft 110 includes a first arm 102 that rotates with respect to a base 101 around a vertical first axis A. The second shaft 120 includes a second arm 103 that is rotatably supported to a tip of the first arm 102 around a vertical second axis B. The third shaft 130 includes a spline shaft 104 at a tip of the second arm 103. The spline shaft 104 is linearly movable in the direction along a vertical third axis C. The fourth shaft 140 rotates the spline shaft 104 around the third axis C.

As illustrated in FIG. 2 to FIG. 10, the coupling 1 according to this embodiment includes a body member 3 that has a fitting hole 2 for fitting an end of the spline shaft 104, a positioning mechanism 4 that positions the body member 3, and the spline shaft 104 fitted in the fitting hole 2 in the circumferential direction of the spline shaft 104, and a fixing portion 5 for fixing the positioned body member 3 and spline shaft 104 so as not to move the body member 3 and the spline shaft 104.

Figure 7:
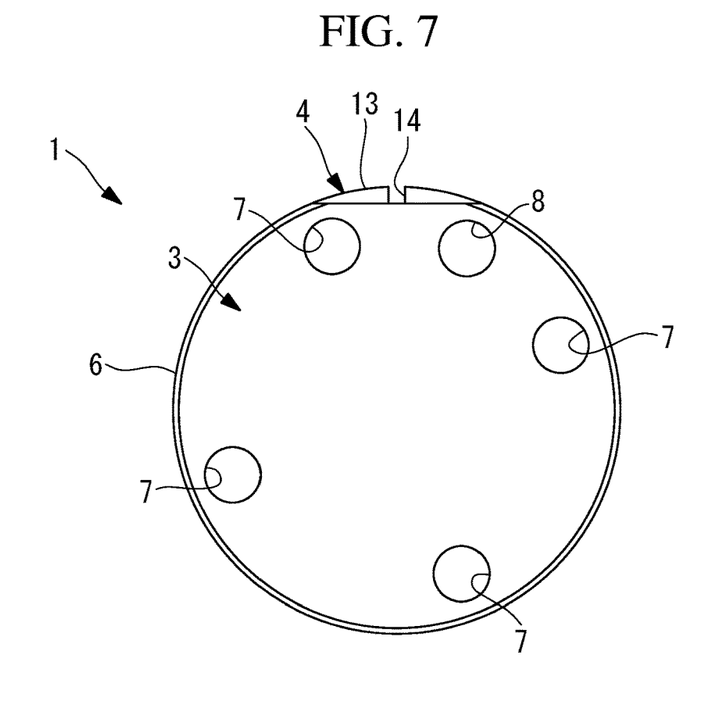
FIG. 7 is a bottom view of the coupling of FIG. 2.
Figure 8:
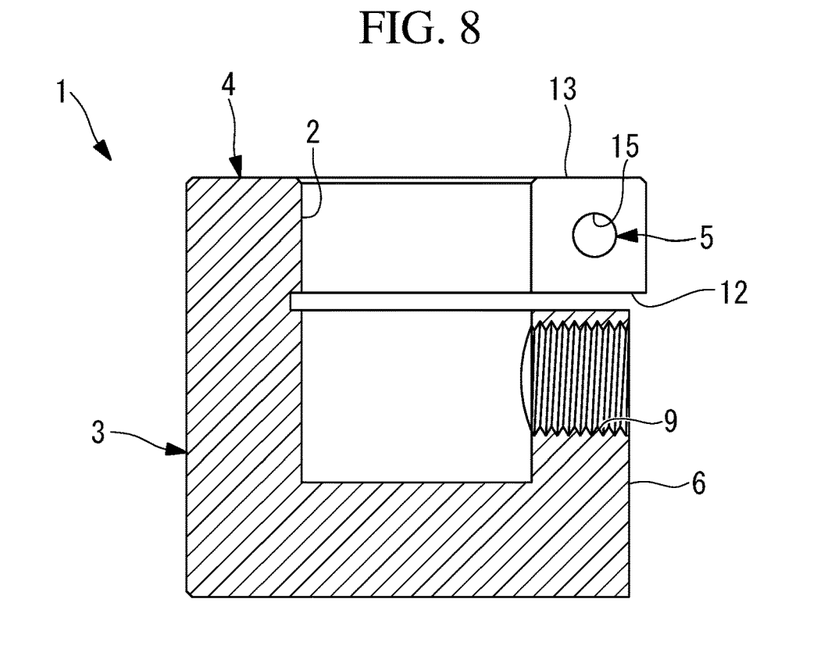
FIG. 8 is a longitudinal sectional view of the coupling of FIG. 2.

As illustrated in FIG. 8, the body member 3 is formed in a substantially cylindrical shape having a longitudinal closed end. As illustrated in FIG. 7, in a tip surface of a flange 6 provided in the closed end, a plurality of screw holes (connecting portion) 7 for mounting a work member (another member) such as a hand and a positioning pin hole (connecting portion) 8 are provided.

Figure 10:
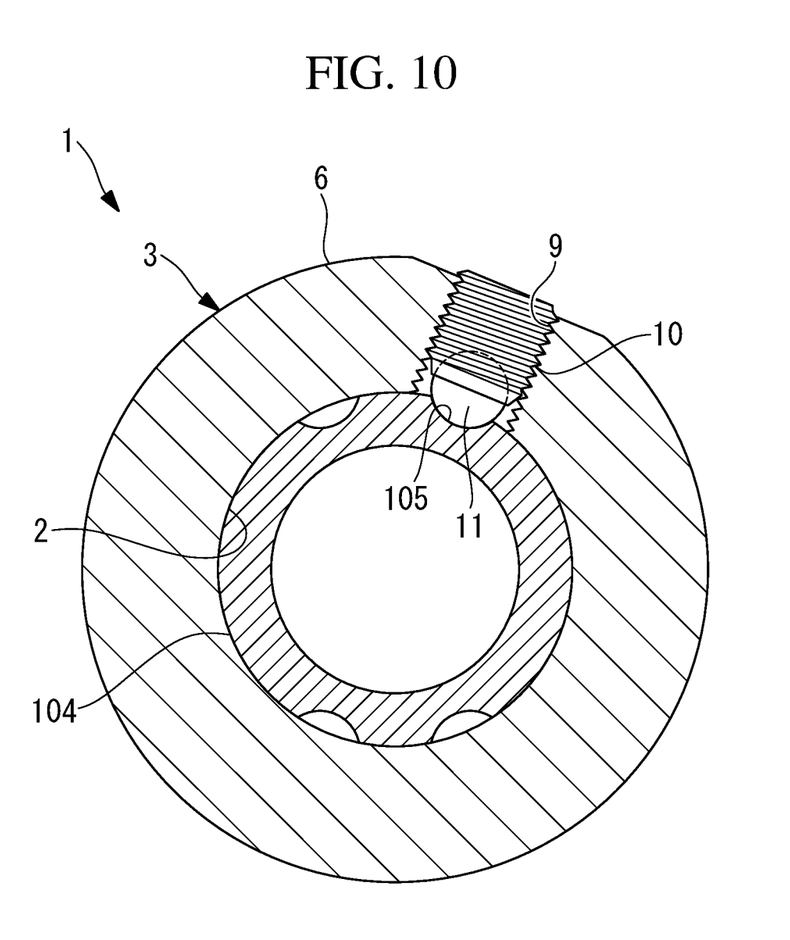
FIG. 10 is a cross sectional view for explaining a positioning mechanism of the coupling of FIG. 2.

As illustrated in FIG. 10, the positioning mechanism 4 includes a screw hole 9 that is provided in the body member 3 so as to radially penetrate from an outer circumferential surface to an inner surface of the fitting hole 2, a screw member 10 that is fastened into the screw hole 9, and radially advanced and retreated by rotation around the longitudinal axis, and a pressing part 11 that is provided in a radially inward tip of the screw member 10.

The pressing part 11 is, for example, a sphere having the outer diameter substantially equal to the inner diameter of a cross section of each of spline grooves 105 (refer to FIG. 10), the center is disposed on a central axis, and the pressing part 11 is fixed to a tip of the screw member 10.

As illustrated in FIG. 2 to FIG. 5, FIG. 8 and FIG. 9, the fixing portion 5 includes an annular portion 13 that is partially connected to the body member 3 and partitioned from the body member 3 by a first slit 12 by providing the first slit 12 which partially and radially cuts an end, on an opposite side to the flange 6, of the body member 3. The annular portion 13 has a substantially C shaped cross section by providing a second slit 14 that cuts a part of the annular portion 13 in the circumferential direction.

Figure 9:
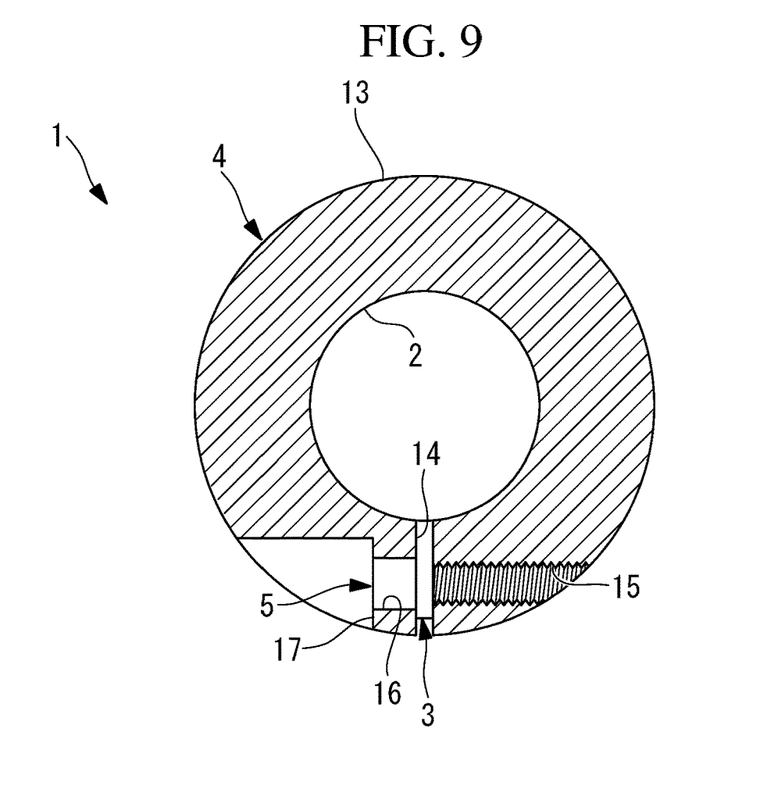
FIG. 9 is a cross sectional view of an annular portion of the coupling of FIG. 2.

As illustrated in FIG. 9, in the fixing portion 5, a screw hole 15 and a through hole 16 are provided at such positions as to face each other with the second slit 14 therebetween. In the drawing, reference numeral 17 denotes a counterbore. The fixing portion 5 includes a bolt (not illustrated) that is inserted from the through hole 16 to be fastened into the screw hole 15. When the bolt is fastened, a distance between surfaces facing with the second slit 14 therebetween can be made closer by tensile force of the bolt.

That is, when the width of the second slit 14 is reduced, the inner diameter of the annular portion 13 becomes smaller than the inner diameter of the fitting hole 2 of the body member 3, and therefore the spline shaft 104 being in a state of being fitted into the fitting hole 2 is fastened from radial outside, and the body member 3 can be fixed to the spline shaft 104 by friction.

A fixing method for fixing thus configured coupling 1 according to this embodiment to the end of the spline shaft 104 will be hereinafter described.

Figure 11:
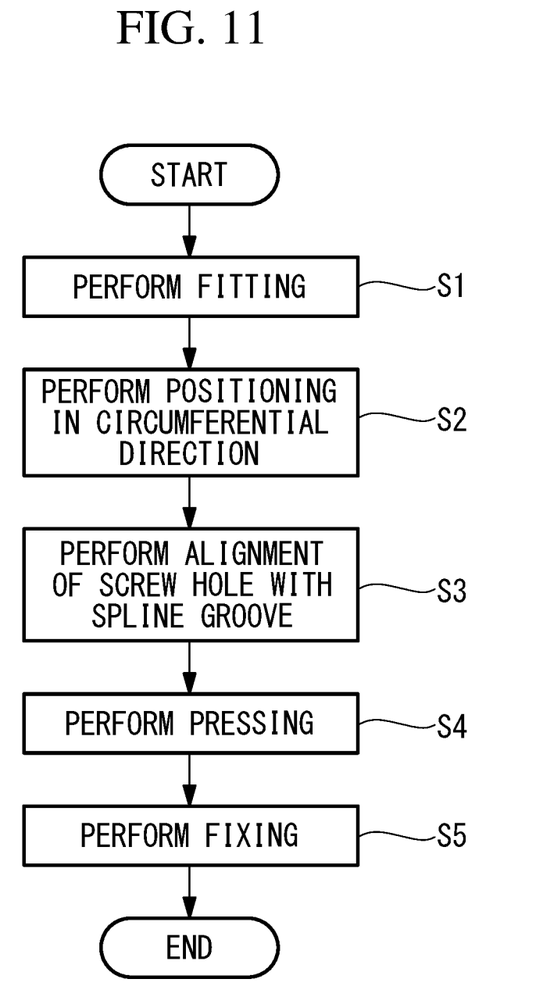
FIG. 11 is a flowchart for explaining a method for fixing the coupling of FIG. 2.

In order to fix the coupling 1 according to this embodiment to the end of the spline shaft 104, as illustrated in FIG. 11, the annular portion 13 of the fixing portion 5 of the coupling 1 is penetrated, and the end of the spline shaft 104 is fitted into the fitting hole 2 of the body member 3 (Step S1).

In this state, an end surface of the spline shaft 104 is pressed against a bottom surface of the fitting hole 2 (Step S2). Consequently, the coupling 1 is positioned in the longitudinal axis direction of the spline shaft 104.

Then, the coupling 1 is rotated around the longitudinal axis of the spline shaft 104, and the screw hole 9 provided in the body member 3 is substantially aligned with any of a plurality of spline grooves 105 provided in the outer surface of the spline shaft 104 (Step S3).

In this state, the screw member 10 is inserted from the pressing part 11 side and fastened into the screw hole 9 of the body member 3, and the pressing part 11 is pressed against any of the spline grooves 105 (Step S4).

Consequently, the body member 3 and the spline shaft 104 are slightly relatively moved in the circumferential direction such that the sphere composing the pressing part 11 is fallen into the spline groove 105, and the sphere is brought into close contact with the inner surface of the spline groove 105. As a result, the body member 3 is positioned in the circumferential direction with respect to the spline shaft 104.

Thereafter, the bolt is inserted from the through hole 16 side of the annular portion 13 of the fixing portion 5, and the bolt is fastened into the screw hole 15 provided on such a side as to face through hole 16 with the second slit 14 therebetween (Step S5). Consequently, the second slit 14 is compressed in such a direction as to reduce the width by the tensile force of the bolt, and the circumferential length of an inner surface of the annular portion 13 is reduced, and therefore the body member 3 can be fixed to the end of the spline shaft 104 in a positioning state by the annular portion 13.

According to the coupling 1 according to this embodiment, the pressing part 11 provided in the screw member 10 is pressed against the spline groove 105 provided in the spline shaft 104, so that the positioning in the circumferential direction is performed, and therefore the spline grooves 105 originally provided in order to move the spline shaft 104 in the longitudinal axis direction can be utilized for the positioning in the circumferential direction. As a result, machining for a plane by D-shaped cut and the like or machining for a keyway and the like for positioning is not required, and there is an advantage that easy configuration can be attained.

The pressing part 11 provided in the tip of the screw member 10 is pressed against the spline groove 105, and therefore the pressing part 11 and the spline groove 105 can be engaged in the circumferential direction of the spline shaft 104. The spline grooves 105 can be accurately machined, and therefore the body member 3 can be fixed to the spline shaft 104 in a state of being accurately positioned in the circumferential direction. The pressing part 11 and the spline groove 105 are engaged in the circumferential direction of the spline shaft 104, and therefore there is an advantage that the positioning state of both the pressing part 11 and the spline groove 105 can be maintained without pressing the pressing part 11 by large pressing force.

When the coupling 1 is detached from the spline shaft 104, the fastening of the screw member 10 composing the positioning mechanism 4 is loosened, the engagement of the pressing part 11 and the spline groove 105 is released, and the fastening of the bolt fastened into the screw hole 15 composing the fixing portion 5 is merely loosened, so that the coupling 1 can be easily detached.

In this embodiment, the sphere is exemplified as the pressing part 11 mounted on the tip of the screw member 10. However, a screw member 10 having a tip machined so as to have a spherical surface shape may be employed, or a hemisphere may be fixed to the tip of the screw member 10.

The outer diameter of the sphere is made to be substantially equal to the inner diameter of each spline groove 105, but is not limited to this. The outer diameter of the sphere may be made to be slightly larger than the inner diameter of each spline groove 105.

With such a configuration, the sphere cannot be brought into close contact with the inner surface of each of the spline grooves 105, but can be come into contact with two portions in the circumferential direction in edges of the boundaries of the spline groove 105 and the outer circumferential surface of the spline shaft 104, and there is an advantage that the sphere and each spline groove 105 can be more reliably engaged in the circumferential direction.

Figure 12:
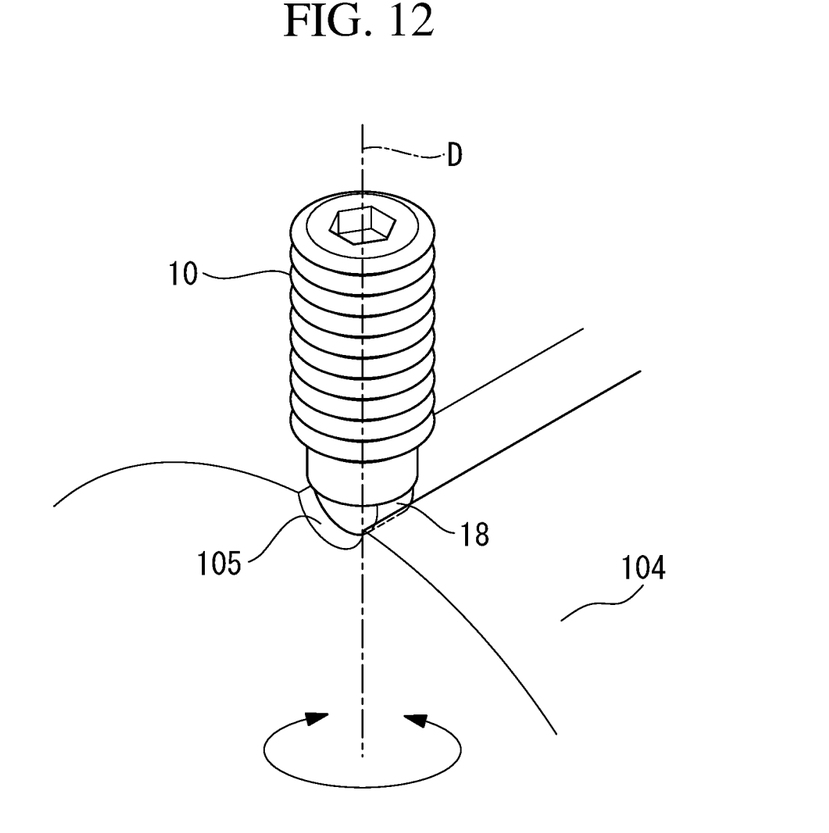
FIG. 12 is a perspective view illustrating a modification of the positioning mechanism used for the coupling of FIG. 2.

In this embodiment, the pressing part having the spherical surface is exemplified as the pressing part 11. However, in place of this, as illustrated in FIG. 12, a columnar member 18 having a cylindrical surface may be employed. The columnar member 18 engages with each of the spline grooves 105 such that an axis of the columnar member 18 is parallel to the longitudinal axis of each of the spline grooves 105, and therefore is preferably mounted so as to be rotatable with respect to a longitudinal axis D of the screw member 10.

Consequently, compared to the pressing part 11 composed of the spherical surface, the pressing part 11 and the spline groove 105 can be brought into contact with each other with wider contact area, contact pressure can be dispersed, and damage of the spline grooves 105 can be suppressed.

In this embodiment, the coupling 1 used as the mounting member of the horizontal articulated type robot 100 is exemplified. However, the present invention is not limited to this, and a coupling 1 that is detachably mounted on the spline shaft 104, is fixed in a positioning state in the circumferential direction, and is used for another purpose connectable with another member may be employed.

From the above-described embodiment, the following invention is derived.

An aspect of the present invention provides a coupling including: a body member including a fitting hole into which an end of a spline shaft is fitted, and a connecting portion to which another member is mounted, the spline shaft including a plurality of spline grooves linearly extending in an axial direction at an interval in a circumferential direction; a positioning mechanism that positions the body member in the circumferential direction of the spline shaft with respect to the spline shaft fitted into the fitting hole of the body member; and a fixing portion that fixes, to the spline shaft, the body member in a state of being positioned by the positioning mechanism, wherein the positioning mechanism includes a screw hole provided in the body member so as to penetrate from an outer surface of the body member to an inner surface of the fitting hole along a radial direction, a screw member fastened into the screw hole, and a pressing part having a circular cross section, provided in a tip of the screw member, and pressed against the spline groove by fastening of the screw member into the screw hole.

According to this aspect, the end of the spline shaft is fitted into the fitting hole, so that the body member is disposed in the end of the spline shaft, and the body member is fixed to the spline shaft by the fixing portion in the state where the body member is positioned in the circumferential direction with respect to the spline shaft by the positioning mechanism, so that the coupling can be mounted so as to be able to be positioned in the circumferential direction of the spline shaft. On the other hand, the fixing by the fixing portion is released, and the positioning by the positioning mechanism is released, so that the spline shaft is taken out of the fitting hole of the body member, and the coupling can be detached.

The connecting portion for connecting another member is provided in the body member, and therefore as long as the coupling is mounted on the spline shaft, another member can be mounted on the spline shaft by the connecting portion. Additionally, the coupling is detached, so that another member can be directly mounted on the spline shaft.

In this case, the positioning by the positioning mechanism utilizes the spline grooves provided in the spline shaft, and therefore the body member can be accurately positioned by using the accurately machined spline grooves without special machining such as a keyway or D-shaped cut.

In the above aspect, the pressing part may have a spherical surface.

Thus, when the screw member is fastened into the screw hole, the pressing part provided in the tip of the screw member rotates integrally with the screw member. According to the pressing part having the spherical surface, the pressing part can be always pressed against the spline groove in the same condition, regardless of the rotation angle of the screw member.

In the above aspect, the pressing part may be a columnar member including a cylindrical surface, and be rotatably mounted on the tip of the screw member around a longitudinal axis of the screw member.

Thus, when the screw member is fastened into the screw hole, the pressing part provided in the tip of the screw member rotates integrally with the screw member. According to the pressing part composed of the columnar member having the cylindrical surface, an axis is disposed in parallel to the longitudinal axis of each spline groove, and the pressing part can stably come into contact with the spline groove with a contact area wider than the contact area of the spherical surface. Additionally, the columnar member can be rotated around the longitudinal axis of the screw member, so that the pressing part can be always pressed against the spline groove in the same condition, regardless of the rotation angle of the screw member.

In the above aspect, the pressing part may have an outer diameter that is not less than an inner diameter of each of the spline grooves.

Thus, the pressing part can be brought into contact with two portions on both sides in the width direction of the spline groove, and the body member can be more reliably maintained in the positioning state with respect to the spline shaft.

Another aspect of the present invention provides a method for fixing a coupling including the steps of: fitting an end of a spline shaft including a plurality of spline grooves into a fitting hole of a body member, the plurality of spline grooves linearly extending in an axial direction at an interval in a circumferential direction; pressing a pressing part having a circular cross section, provided in a tip of a screw member, against the spline groove by fastening the screw member into a screw hole provided in the body member so as to penetrate from an outer surface of the body member to an inner surface of the fitting hole along a radial direction, and positioning the body member in the circumferential direction of the spline shaft; and fixing the body member in a state of being positioned to the spline shaft.

REFERENCE SIGNS LIST 1 coupling
2 fitting hole
3 body member
4 positioning mechanism
5 fixing portion
7 screw hole (connecting portion)
8 positioning pin hole (connecting portion)
9 screw hole
10 screw member
11 pressing part
18 columnar member (pressing part)
104 spline shaft
105 spline groove
D longitudinal axis

The invention claimed is:

1. A method for fixing a coupling comprising the steps of:
fitting an end of a spline shaft including a plurality of spline grooves into a fitting hole of a body member, the plurality of spline grooves linearly extending in an axial direction at an interval in a circumferential direction;
pressing a pressing part having a circular cross section, provided in a tip of a screw member, against the spline groove by fastening the screw member into a screw hole provided in the body member so as to penetrate from an outer surface of the body member to an inner surface of the fitting hole along a radial direction, and positioning the body member in the circumferential direction of the spline shaft; and
fixing the body member in a state of being positioned to the spline shaft.

* * * * *